United States Patent [19]
Byers

[11] 3,742,981
[45] July 3, 1973

[54] FLOW CONTROL VALVE WITH SINGLE SPOOL SECOND STAGE

[75] Inventor: James Otto Byers, Manchester, N.H.

[73] Assignee: Sanders Associates, Inc., Nashua, N.H.

[22] Filed: Feb. 24, 1972

[21] Appl. No.: 229,044

[52] U.S. Cl. .......................................... 137/625.63
[51] Int. Cl. ............................................ F16k 11/07
[58] Field of Search .......... 137/82–86, 625.6–625.69

[56] References Cited
UNITED STATES PATENTS
3,561,488   2/1971   Byers ......................... 137/625.63 X Primary Examiner—Henry T. Klinksiek
Attorney—Louis Etlinger

[57] ABSTRACT

A two stage valve system is described in which the rate of flow of fluid to the load depends solely on the input signal to the first stage. Both stages are spool type valves. The second stage is formed to provide a passageway to allow fluid to flow from the first stage to the load, which passageway is opened simultaneously with the opening of the usual passageway from the second stage supply to the load. Additionally, the second stage supply is connected through restricted passageways to the second stage end spaces.

19 Claims, 8 Drawing Figures 3,742,981

FLOW CONTROL VALVE WITH SINGLE SPOOL SECOND STAGE

FIELD OF THE INVENTION

This invention relates generally to hydraulic valve systems for controlling the flow of fluid to and from a useful load and particularly to such valves in which the rate of flow of fluid to the load is determined solely by an input signal and is independent of the back pressure exerted by the load.

BACKGROUND OF THE INVENTION

There are many applications of valves in which it is desirable that the rate of flow of fluid to the load be independent of the load pressure. One approach to the problem, typified by the Hayner U.S. Pat. No. 3,126,031, involves measuring the actual rate of flow to the load and feeding back a signal indicative thereof to the first stage.

Another approach to the problem is that described in U.S. Pat. No. 3,561,488, granted Feb. 9, 1971 to the present applicant and entitled "Fluid Flow Control Valve." Briefly stated, this patent describes a two stage valve in which the flow of fluid to the load includes not only the usual flow from the second stage supply but also includes flow from the first stage. As explained in the patent, the rate of flow to the load from the first stage depends solely on the input signal and the rate of flow from the second stage supply is proportional to the rate of flow from the first stage. As a result, the total rate of flow to the load depends solely on the input signal.

One embodiment (that of FIG. 1) of the invention described and claimed in the above mentioned U.S. Pat. No. 3,561,488 includes a force motor for controlling a spool type first stage which in turn controls the second stage. The second stage itself includes two spools which are active alternatively, depending upon the sense of the input signal. While this arrangement is entirely satisfactory in operation, the two spool construction is complex, bulky, and requires many interconnections. When an attempt is made to combine the function of the two spools in a single spool, a number of problems are encountered, not the least of which is that of the conflicting pressure requirements at the ends of the spool. In the two spool construction, one end of each spool is subjected to the pressure of the second stage supply while the two remaining ends are subjected to the pressure of the first and second control lines from the first stage. Accordingly, when a single spool design is attempted, it would appear that there are three separate pressures required but only two spool ends to which to apply them. Resolution of these conflicting requirements has hitherto thwarted attempts to substitute one spool for two.

It is an object of the present invention to provide a two stage valve system employing a spool type first stage in which the rate of flow of fluid to the load depends solely on the input signal but which nevertheless requires but a single spool in the second stage.

SUMMARY OF THE INVENTION

A preferred form of valve system incorporating the present invention includes a spool type first stage valve the two control lines from which are connected to the opposite end spaces of a second stage four way valve having a valve body and spool formed with suitable ports and lands to selectively interconnect first and second load lines to supply and return lines. The second stage spool is also formed with first and second passageways connecting opposite end spaces to additional passageways which, upon displacement of the spool, are opened to the load simultaneously with the opening of the usual passageway from the supply to the load. These passageways are similar to those described in the aforementioned U.S. Pat. No. 3,561,488. Additionally, as one end space is subjected to the flow of fluid from the first stage, the other end space is automatically biased by the pressure of the second stage supply. Such biasing may be obtained by valving or more simply by restrictors such as two orifices formed in the second stage spool so as to establish restricted communication between each of the first and second passageways and the interior of the valve body in the region of the supply port.

DESCRIPTION OF PREFERRED EMBODIMENT

For a clearer understanding of the invention, reference may be made to the following detailed description and the accompanying drawing, in which.

Figure 1:
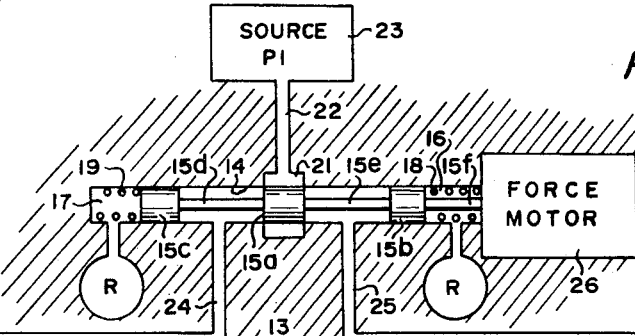
FIG. 1 is a schematic cross section view of a valve system incorporating the invention.
Figure 1:
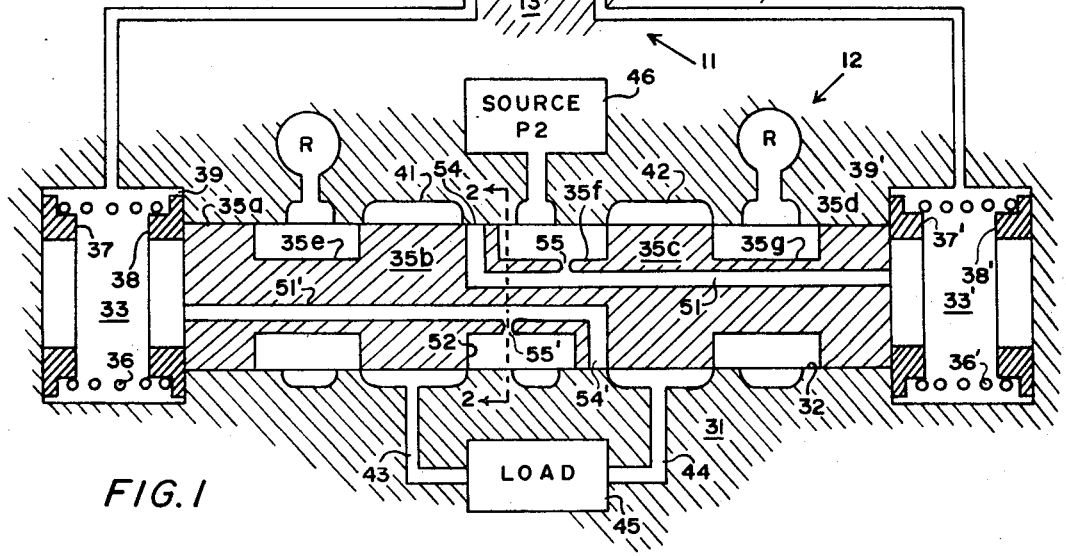

Referring first to FIG. 1, there is shown a two stage valve system including a three way spool type first stage valve, indicated generally by the reference character 11, and a four way spool type second stage valve, indicated generally by the reference character 12. The first stage 11 includes a valve body 13 formed to define a hollow cylinder 14. A valve spool is located within the cylinder and is referred to generally by the designation 15. Particular portions of the spool are denoted by the reference character 15 plus a letter. More particularly, the spool 15 includes a central land 15a and opposite end lands 15b and 15c all engaging the inside surface of the hollow cylinder 14 and joined by reduced diameter portions 15d and 15e. The cylinder 14 is longer than the spool 15 thereby defining end spaces 16 and 17 which contain centering springs 18 and 19. Both end spaces are connected to the return line, or reservoir, designated R. The valve body 13 is also formed to define a central groove, or port, 21 which is connected by a conduit 22 to a source 23 of fluid having a pressure P1. In the neutral, or reference, position of the spool 15 shown in FIG. 1, the land 15a occludes the port 21. Two control conduits 24 and 25 communicate with the interior of the cylinder on opposite sides of the port 21 in the region of the reduced diameter portions 15d and 15e respectively. A force motor 26 is operatively connected to the spool 15 by means of a further reduced diameter portion 15f.

The second stage 12 includes a valve body 31 formed to define a hollow cylinder 32 and two end spaces 33 and 33'. A spool referred to generally by the reference character 35, is disposed in the cylinder 32 and includes lands 35a, 35b, 35c, and 35d engaging the interior surface of the cylinder 32 and interconnected by reduced diameter portions 35e, 35f and 35g. The end space 33 communicates with the control conduit 24 and contains a compression spring 36 acting between a flanged washer 37 bearing against the end of the cylinder 32 and another flanged washer 38. When the spool 35 is in its neutral position, as shown, the inner portion of the washer 38 engages the end of the land 35a while the outer portion, which is of greater diameter than the land 35a, engages a shoulder portion 39 of the valve body 31. The end space 33' communicates with the control conduit 25 and contains similar parts, namely, a spring 36' and two flanged washers 37' and 38' similarly arranged. The springs 36 and 36' are each pre-loaded and provide a definite neutral position for the spool 35.

The valve body 31 is formed to define grooves, or ports 41 and 42 which communicate, by means of conduits 43 and 44, with a useful load 45. In the neutral position of the spool 35, as shown, the lands 35b and 35c occlude the ports 41 and 42 respectively. The interior of the cylinder 32 in the regions of the reduced diameter portions 35e and 35g is connected to the return line R. A source 46 of fluid at a pressure P2, less than pressure P1, is connected to the interior of the cylinder 32 in the region between the load ports 41 and 42. The sources 23 and 46 may be independent sources, or source 46 may be derived from source 23 through a pressure reducing valve, or source 23 may be derived from source 46 by means of a pressure booster. What is important is that P1 be greater than P2.

Figure 2:
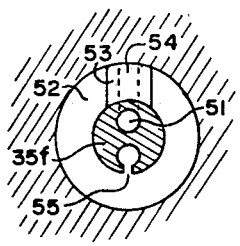
FIG. 2 is a cross section view taken on the line 2—2 of FIG. 1.
Figure 3:
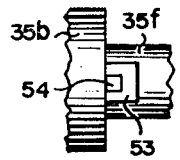
FIG. 3 is a fragmentary plan view, with the valve body removed, of that portion of the apparatus which is shown in FIG. 2.

The spool 35 is formed with a longitudinal passageway 51 which extends from the end space 33' to that face 52 of the land 35b which is subjected to the pressure P2. The spool 35 also includes a protruding portion, or boss, 53 which abuts and extends longitudinally outward a short distance from the face 51 and which extends radially from the reduced diameter portion 35f to the interior surface of the cylinder 32. As best shown in FIGS. 2 and 3, the boss 53 extends only a short distance in the circumferential direction and its outer surface is convex and complements the interior concave surface of the cylinder 32. The boss 53 and the portion 35f of the spool 35 include a slot formed to define a generally rectangular radial passageway 54 one wall of which is the substantially planar face 52 of the land 35b. The radial passageway 54 is open at the outer convex surface of the boss 53 and extends to and communicates with the longitudinal passageway 51. The arrangement of the longitudinal and radial passageways as so far described is similar to that described in the aforementioned U.S. Pat. No. 3,561,488 except that the radial passageway in the present case extends along one radius only instead of extending along a diameter, as it does in the patent. Additionally, however, the spool 35, and more particularly the portion 35f, is formed to define a restricted passageway, preferably in the form of an orifice 55, which connects the longitudinal passageway 51 with that portion of the interior of the cylinder 32 which communicates with the source 36 at the pressure P2.

A longitudinal passageway 51' similar to the passageway 51 extends from the end space 33 to that face of the land 35c which is subjected to the pressure P2. The passageway 51' communicates with a radial passageway 54', similar to the radial passageway 54 and formed in a similar manner. An orifice 55' interconnects the longitudinal passageway 51' with that portion of the cylinder 32 which communicates with the source 36 at the pressure P2.

OPERATION

In the absence of an input signal to the force motor 26 all the parts will be in their respective neutral, or reference, positions as shown in the drawing. The pressure P2 of the source 46 is transmitted through the orifices 55, 55' and the longitudinal passageways 51 and 51' to the end spaces 33 and 33'. The radial passageways 54 and 54' are closed by the interior surface of the cylinder 32.

Let it now be assumed that an input signal is applied to the force motor 26 and that in response thereto the motor 26 displaces the spool 15 to the left. Such displacement opens a passageway across the land 15a from the port 21 to the interior of the cylinder 14 thereby allowing fluid to flow from the source 23 through the conduit 22, the port 21, and the cylinder 14 to the control conduit 25. Since the pressure P1 is greater than the pressure P2, fluid flows from the conduit 25 to the end space 33', through the longitudinal passageway 51 and the orifice 55 to the source 46. Such flow of fluid causes a pressure drop to appear across the land 15a and another pressure drop to appear across the orifice 55. The pressure in the end space 33' tends to rise but the spool 15 is at first held stationary by the action of the spring 36. Fluid continues to flow, increasing the pressure drop across the orifice 55 and increasing the pressure in the end space 33'. When this pressure is sufficient to overcome the preloading of the spring 36, the piston 15 is displaced to the left, thereby partially opening the radial passageway 54 and allowing fluid to flow therethrough to the load port 41. The pressure drop across the orifice 55 will not increase further but will remain constant at the value necessary to overcome the spring 36. As the spool 35 is displaced further to the left, the increasing flow through the passageway 54 causes the pressure drop across the land 15a to increase until the pressure in the end space 33' is equal to P2 plus that necessary to overcome the spring. Stated mathematically, the pressure in the end space 33' becomes equal to P2 + F/A where F is the force exerted by the spring 36 and A is the effective area of the end of the spool 35 on which the fluid is acting. When this pressure is reached, the spool 35 stops moving and remains in its then attained displaced position as long as these pressure conditions remain unchanged.

The operation can be explained by noting various conditions:

1. For every value of input signal to the force motor 26 there is a corresponding displacement of the spool 15.

2. During operation, the pressure drop $\Delta P$ across the land 15a is always stabilized at the same value, namely, $P_1 - (P_2 + F/A)$, regardless of the extent of spool displacement.

3. For every displacement of the spool 15 there is corresponding rate of flow of fluid through the first stage. Let us designate this rate of flow as $Q_1$.

4. For every rate of flow through the first stage there is a corresponding rate of flow through the passageway 54 to the load. This rate is equal to $Q_1 - Q_2$ where $Q_2$ is the rate of flow through the orifice 55. (This flow is small and occurs only because the spring 36 requires the pressure in the end space 33' and in the passageway 51 to be slightly greater than $P_2$).

5. Therefore, for every value of input signal to the force motor 26 there is a corresponding rate of flow through the passageway 54 to the load.

6. Simultaneously with the opening of the small passageway 54 to the load port 41 by the displacement of the spool 35, the larger passageway around the remainder of the land 35b is also opened, allowing fluid to flow from the source 46 to the load. The cross section areas of these two passageways are measured by the lengths of the respective arcs across which fluid flows, and since these lengths have a fixed ratio, as can be seen from FIG. 2, the areas are directly proportional. The pressure drops across these passageways also correspond and are nearly the same. The pressure on one side of both is that of the load. The pressure on the other side of the larger is P2 while that on the corresponding side of the smaller is P2+F/A. Therefore, for each rate of flow from the first stage through the passageway 54 to the load, there is an exactly corresponding rate of flow from the source 46 to the load. These two rates of flow are approximately proportional. The relationship departs from linearity only because the pressure in the longitudinal passageway 51 is greater than $P_2$. If the springs 36 and 36' were absent, the relationship would be exactly linear. But even with the springs present, the nonlinearity is small because, in comparison with the fluid pressures normally used, the force of the springs is very small, ordinarily being only sufficient to provide a small but definite "dead space" in the absence of an input signal so that a small threshold value of input signal must be exceeded in order to actuate the valve.

Any change in the input signal causes a corresponding change in the rate of flow of fluid to the load; when the input signal is reduced to zero, the pressure in both end spaces 33 and 33' returns to $P_2$ and the springs 36 and 36' return the spool 35 to its neutral position. When a signal of opposite sense is applied, a comparable but opposite sequence of events takes place, with the spools 15 and 35 both being displaced to the right and with fluid flowing through the passageway 54' and across the land 35c to the load port 42.

Figure 4:
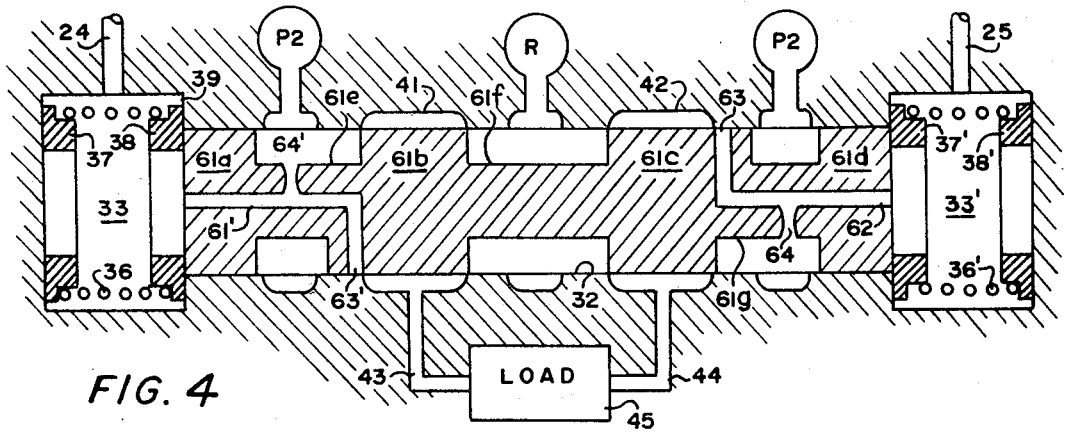
FIG. 4 is a schematic cross section view showing the invention incorporated into a different valve system.

Referring now to FIG. 4, the invention is shown as applied to slightly different valve. The valve body 31 is the same as in FIG. 1 and is formed with the same hollow cylinder 32, end spaces 33 and 33' and load ports 41 and 42. The same centering springs 36, 36' bearing against washers 37, 37' and 38, 38' are included. Control conduits 24 and 25 are connected to the end spaces 33 and 33' as before. The load 45 is connected by conduits 43 and 44 to ports 41 and 42 as before. However, the spool, referred to generally by the reference character 61, is different. It includes lands 61a, 61b, 61c and 61d each engaging the inner surface of the cylinder 32 and interconnected by reduced diameter portions 61e, 61f and 61g.

Pressure and return connections are reversed from those shown in FIG. 1. The return line R is connected to the interior of the cylinder 32 near the center in the region between the lands 61b and 61c. The source of fluid at pressure P2 is connected to the interior of the cylinder 32 in two places, namely, in the region between the lands 61a and 61b and in the region between the lands 61c and 61d.

The spool 61 is formed with a longitudinal passageway 62, similar to the passageway 51 of FIG. 1, which extends from the end space 33' to a radial passageway 63, (similar to the passageway 54 of FIG. 1) and which in turn extends along that face of the land 61c which is subjected to the pressure P2. A restricted passageway, such as an orifice 64, extends from the passageway 62 to the interior of the cylinder 32 in the region that communicates with the pressure P2. The opposite end of the spool 61 is formed with complementary passageways 61' and 63', similar to the passageways 51' and 54' of FIG. 1. Since the two longitudinal passageways are not required to extend side by side, they may be formed on the axis of the spool 61, as shown, but this is not essential. The radial passageways 63 and 63' may be formed and defined in a manner similar to that described in connection with FIG. 1, and, if desired, each may be duplicated so as to have dual passageways at diametrically opposite locations, similar to the arrangement of U.S. Pat. No. 3,561,488. The operation of the device of FIG. 4 is substantially the same as that of FIG. 1.

Figure 5:
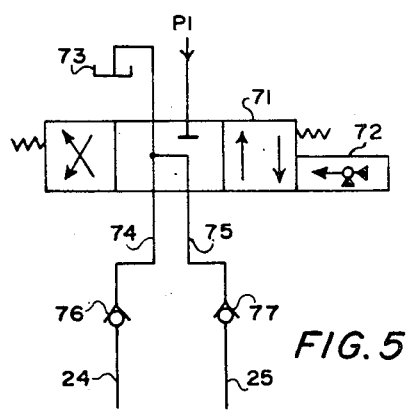
FIGS. 5, 6, 7 and 8 are schematic diagrams illustrating various alternative forms for the first stage.

As shown in FIG. 5, the invention may also be used with a four way spool valve as the first stage. In this schematic showing, the four way valve 71 is actuated by a force motor 72. In the neutral position the pressure source P1 is disconnected, that is, blocked, while the reservoir 73 is connected to both of the output lines 74 and 75. These lines in turn are connected through check valves 76 and 77 respectively to the control lines 24 and 25. The force motor 72 variably connects the pressure P1 and the reservoir to the lines 74 and 75 in a sense determined by the input signal to the force motor 72. The check valves prevent back flow when the valve is in neutral. The second stage may be that shown in either FIG. 1 or FIG. 4 and operation is substantially the same.

Figure 6:
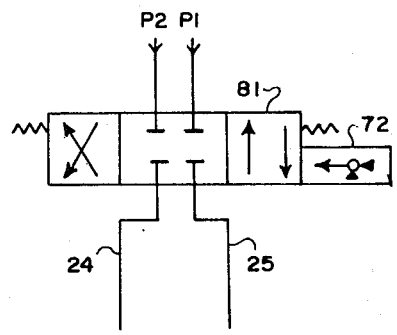

FIG. 6 shows a slightly different arrangement in which a four way valve 81 is arranged to connect the first stage pressure P1 and the lower, second stage pressure P2 to the control lines 24 and 25 in a sense determined by the sense of the input signal. The second stage may be that of either FIG. 1 or FIG. 4 and no check valves are necessary. Additionally, the orifices 51, 51' and 64, 64' could be omitted, although operation is satisfactory either with or without them. Operation is substantially the same as that previously described.

Figure 7:
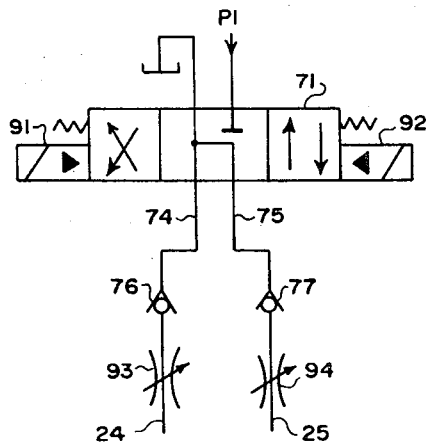

FIG. 7 shows an arrangement in which a fixed predetermined flow rate in either direction may be obtained repeatedly. In this arrangement, the four way valve 71 of FIG. 5 is used but the force motor 72 is replaced by two solenoids 91 and 92 each of which, when energized, fully opens the valve in one direction or the other. The predetermined rates of flow are selected by adjusting two variable restrictors 93 and 94 which are inserted between the check valves 76 and 77 and the control lines 24 and 25.

Figure 8:
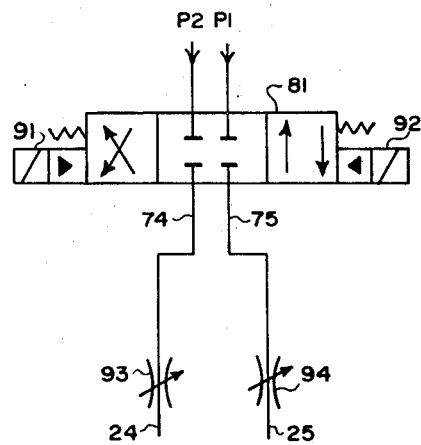

FIG. 8 shows an arrangement similar to that of FIG. 7. The valve 81 of FIG. 6 is actuated by the two solenoids 91 and 92. The output lines 74 and 75 are connected directly to the variable restrictors 93 and 94. The check valves are not necessary because all flow is blocked when the valve 81 is in its neutral position.

From the foregoing it will be apparent that applicant has provided a novel single spool second stage flow control valve. As one end of the spool is subjected to the pressure of the first stage supply, as modified by flow through the first stage, the other end is automatically biased by the pressure of the second stage supply. Such biasing may be obtained by various arrangements of valves and/or restrictors, preferred examples of which have been illustrated. Other arrangements are possible. For example, the restrictors may be connected anywhere between the second stage supply and the end spaces and need not be in the form of orifices in the spool, as shown, although at present this is the preferred arrangement. Many other modifications will occur to those skilled in the art. It is therefore desired that the protection afforded by Letters Patent be limited only by the true scope of the appended claims.

What is claimed is:

1. A valve system for controlling the flow of fluid to a load which system includes two stages and in which both the first and second stages are spool valves and in which the second stage valve is constructed to define and open a passageway from the first stage to the load simultaneously with the opening of a passageway from the second stage supply to the load, characterized in that the valve includes means, operative upon subjection of one end of the second stage spool to the control pressure from said first stage, for automatically subjecting the other end of said spool to the pressure of the second stage supply.

2. A valve system in accordance with claim 1 in which said means includes a restricted passageway interconnecting said second stage supply with said other end.

3. A valve system in accordance with claim 1 in which said means includes first and second restricted passageways each interconnecting said second stage supply with one of said ends.

4. A valve system in accordance with claim 1 in which said means includes first and second orifices formed in said spool, each interconnecting one of said ends with said second stage supply.

5. A valve system in accordance with claim 1 in which said first stage valve is a four way valve and which includes first and second check valves in the control lines between said first and second stages arranged to prevent the flow of fluid from said second stage to said first stage.

6. A valve system in accordance with claim 1 in which said first stage valve is a four way valve connected to selectively interconnect first and second sources of fluid under pressure to opposite ends of said second stage spool in a sense determined by the sense of an input signal.

7. A valve system in accordance with claim 1 which includes first and second sources of fluid under pressure for said first and second stages respectively, said second source being at a pressure less than that of said first source, and in which said means includes said first stage valve which is a four way valve connected to selectively interconnect said first and second sources to opposite ends of said second stage spool in a sense determined by the sense of an input signal.

8. A valve system for controlling the flow of fluid to a load, which system includes first and second spool valve stages and first and second sources of fluid under pressure for said first and second stages respectively, said second source being at a pressure less than that of said first source, and which includes means for subjecting, selectively, either end of said second stage spool to a control pressure from said first stage, and in which said second stage valve is constructed to define and open a passageway from that end of said second stage spool so subjected to control pressure to said load simultaneously with the opening of a passageway from the second stage supply to the load, characterized in that the valve system includes means, operative upon such subjection of control pressure to one end of said spool, for automatically subjecting the other end of said spool to the pressure of said second stage supply.

9. A valve system in accordance with claim 8 in which said last named means includes a restricted passageway interconnecting said second source with said other end of said second stage spool.

10. A valve system in accordance with claim 8 in which said last named means includes first and second restricted passageways each interconnecting said second source with one of said ends of said second stage spool.

11. A valve system in accordance with claim 10 in which said restricted passageways each include an orifice formed in said spool.

12. A valve system in accordance with claim 8 in which said first stage includes a four way valve and which includes first and second control lines connecting said four way valve to said ends of said second stage spool and which further includes first and second check valves interposed in said first and second control lines respectively for preventing the flow of fluid from said second stage to said first stage.

13. A valve system in accordance with claim 8 in which said first stage includes a four way valve installed to operatively connect said first and second sources selectively to opposite ends of said second stage spool in a sense determined by an input signal.

14. A valve system for controlling the flow of fluid to a load, comprising, a four way spool valve for use as a second stage valve in a system employing a spool valve as the first stage, characterized in that said four way valve includes longitudinal passageways in the spool interconnecting the end spaces with passageways which are opened to the load conduits simultaneously with the opening of passageways to said load conduits from the second stage fluid source, and in that there are provided first and second means each including a restricted passageway, each for interconnecting said second stage supply with one of said end spaces.

15. A valve system in accordance with claim 14 in which said restricted passageways are formed transversely in said spool so as to interconnect said longitudinal passageways with a space communicating with said source.

16. A valve system for controlling the flow of fluid to a load, comprising, a first stage including a first spool moveable in a first hollow cylinder in response to an input signal for variably opening a passageway from a first source of fluid under pressure to either a first or a second control conduit, according to the sense of an input signal, a second stage comprising a four way valve including a housing formed with a second hollow cylinder and having a spool moveable therein, said housing being formed with ports for connection to first and second load conduits, to a return conduit and to a second source of fluid under pressure less than that of said first source, said spool including first and second lands which occlude said first and second load ports respectively when said spool is in its neutral position each of said lands including two faces, one subjected to the pressure of said second source and the other subjected to the pressure of said return conduit, said lands being arranged to connect said load conduits to said second source and to said return conduit in a sense determined by the direction of displacement of said spool, said second cylinder and housing being formed to define first and second end spaces at opposite ends thereof, and, means for connecting said first and second control conduits to said first and second end spaces respectively, characterized in that said second spool is formed with first and second longitudinal passageways communicating with said first and second end spaces respectively, and also communicating with first and second radial passageways, respectively, each comprising a slot in a boss abutting that face of that land which is subjected to the pressure of said second source and which faces that end space with which its associated passageway communicates, each of said radial passageways extending to and being open adjacent to the outer cylindrical surface of its associated land, and in that there are provided first and second means each including a restricted passageway for interconnecting said second source with said first and second end spaces respectively.

17. A valve system in accordance with claim 16 in which said restricted passageways include first and second orifices formed in said second pool in such locations as to interconnect said first and second longitudinal passageways respectively with a region of space within said second cylinder which is subject to the pressure of said second source.

18. A valve system in accordance with claim 16 in which said first stage includes a three way valve.

19. A valve system in accordance with claim 16 in which said first stage includes a four way valve connected to open substantially simultaneously and variably either a passageway from said first source to said first control conduit and a passageway from said return conduit to said second control conduit or a passageway from said first source to said second control conduit and a passageway from said return conduit to said first control conduit and which further includes first and second check valves interposed in said first and second control conduits respectively and connected to prevent the flow of fluid from said second stage to said first stage.

* * * * *